United States Patent
Trott et al.

(10) Patent No.: US 10,349,328 B2
(45) Date of Patent: Jul. 9, 2019

(54) MOBILITY IN A MULTI-NETWORK WIRELESS SYSTEM

(71) Applicant: Google Inc., Mountain View, CA (US)

(72) Inventors: Mitchell Trott, San Mateo, CA (US); Krishna Kamal Sayana, San Jose, CA (US); Dutt Kalapatapu, Santa Clara, CA (US); Rajeev Koodli, Mountain View, CA (US); Hassan Sipra, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/651,501

(22) Filed: Jul. 17, 2017

(65) Prior Publication Data

US 2018/0027466 A1 Jan. 25, 2018

Related U.S. Application Data (60) Provisional application No. 62/365,532, filed on Jul. 22, 2016.

(51) Int. Cl.
| | | |
|---|---|---|
| *H04W 36/30* | (2009.01) | |
| *H04W 4/00* | (2018.01) | |
| *H04W 36/14* | (2009.01) | |
| *H04W 36/36* | (2009.01) | |
| *H04W 88/06* | (2009.01) | |

(52) U.S. Cl.
CPC .......... *H04W 36/14* (2013.01); *H04W 36/30* (2013.01); *H04W 36/36* (2013.01); *H04W 88/06* (2013.01)

(58) Field of Classification Search
CPC .......... H04W 76/048; H04W 36/0055; H04W 36/14; H04W 26/88; H04W 88/06; H04W 4/00

See application file for complete search history.

(56) References Cited

U.S. PATENT DOCUMENTS

| | | | |
|---|---|---|---|
| 8,228,837 B2 | 7/2012 | Sheriff et al. | |
| 8,767,695 B2 | 7/2014 | Sheriff et al. | |
| 9,154,984 B1 | 10/2015 | Jain | |
| 9,467,912 B2 * | 10/2016 | Zhang | H04W 36/0055 |
| 9,814,009 B2 | 11/2017 | Bartlett | |
| 9,832,716 B2 * | 11/2017 | Tan | H04W 36/30 |
| 10,097,694 B1 | 10/2018 | Salisbury et al. | |
| 10,143,018 B2 | 11/2018 | Sheriff et al. | |
| 2015/0095453 A1 | 4/2015 | Jain et al. | |
| 2016/0234707 A1 * | 8/2016 | Kazmi | H04W 76/048 |
| 2017/0099126 A1 * | 4/2017 | Yoo | H04L 5/0048 |
| 2017/0230869 A1 * | 8/2017 | Kubota | H04L 5/0048 |
| 2018/0027466 A1 * | 1/2018 | Trott | H04W 36/14 |

* cited by examiner

*Primary Examiner* — William D Cumming
(74) *Attorney, Agent, or Firm* — Honigman Miller Schwartz and Cohn LLP (57) ABSTRACT

A method includes receiving one or more data packets from an external network when a user device connects to a first network. The user device is configured for dual connectivity with the first network and a second network. The method also includes transmitting a measurement configuration to a modem of the user device and receiving a measurement report from the modem. When it is feasible for the modem to perform a network change, the method includes transmitting a network change command to the modem. The network change command causes the modem to perform the network switch to connect the user device to the second network.

22 Claims, 6 Drawing Sheets

MOBILITY IN A MULTI-NETWORK WIRELESS SYSTEM

CROSS REFERENCE TO RELATED APPLICATIONS

This U.S. patent application claims priority under 35 U.S.C. § 119(e) to U.S. Provisional Application 62/365,532, filed on Jul. 22, 2016, which is hereby incorporated by reference in its entirety.

TECHNICAL FIELD

This disclosure relates to mobility in a multi-network wireless system, and more particularly, to mobility of a user device supporting dual connectivity to a macro-cell network and a neutral host network.

BACKGROUND

A Long-Term Evolution (LTE) network provides wireless communication of high-speed data for mobile devices and data terminals. LTE networks increase the capacity and speed of existing radio access network (RAN) technologies by using a different radio interface with core network improvements. The wireless communication network may include a number of base stations that can support communication for a number of user devices. Generally, when a user device, such as a mobile phone, moves from a proximity of one base station to another, the mobile and fixed components of the LTE network exchange radio measurements and control messages to ensure that the mobile device is always ready to receive and transmit data to and from outside networks, such as the internet or a voice service.

Mobile network operators design wireless networks with an emphasis on conserving battery power at the user devices of its subscribers and permitting brief data interruptions when the mobile device transitions from one base station to another. Specifically, LTE mobile user devices have a Radio Resource Control (RRC) Idle mode where the user device autonomously makes switching decisions driven by policy provided by the mobile network operator or built into the modem of the user device. For instance, the network policy may instruct the mobile device to switch from a current base station to a target base station when a signal quality of the target base station is greater than that of the base station by a threshold amount. Moreover, LTE mobile user devices have an RRC Connected mode where the mobile device has an active connection with a particular base station. Conversely to the RRC Idle mode where the mobile device makes mobility decisions, the base station makes mobility decisions when the user device is in the RRC Connected mode by instructing the mobile device to imitate a handover to a different base station.

Mobile network operators design mobility so that mobility works well within a network type, e.g., by switching from one LTE base station to another, and across network types, e.g., switching from an LTE base station to a GSM base station. Moreover, the deployment of additional LTE networks administered by enterprises of entities separate from the mobile network operator is increasing. For instance, a shopping venue may deploy a neutral host LTE network via one or more access points within its boundaries for providing wireless content to its providers. Here, the user device may support dual connectivity to either of the LTE networks for connecting to an outside network (e.g., the internet). However, integrating and tuning the two LTE networks to allow for the user device to transition between the two LTE networks in a power-efficient manner with only brief data interruptions can be problematic. For instance, the base stations (e.g., access points) associated with each of the LTE networks include different administration and management systems, making it burdensome for the mobile network operator to implement integration with each of potentially millions of disparate neutral host networks deployed by multiple enterprises.

SUMMARY

One aspect of the disclosure provides a method for mobility in a multi-network wireless system. The method includes receiving, at data processing hardware of a user device, one or more data packets from an external network when the user device connects to a first network, the user device configured for dual connectivity with the first network and a second network. The method further includes: transmitting a measurement configuration from the data processing hardware to a modem of the user device; receiving, at the data processing hardware, a measurement report from the modem, the measurement report based on the transmitted measurement configuration; and determining, by the data processing hardware, whether it is feasible for the modem to perform a network switch to connect the user device to the second network based on the received measurement report. When it is feasible for the modem to perform the network change, the method includes transmitting a network change command from the data processing hardware to the modem, the network change command causing the modem to perform the network switch to connect the user device to the second network.

Implementations of the disclosure may include one or more of the following optional features. In some implementations, the first network includes one of a macro-cell network or a neutral host network and the second network comprises the other one of the macro-cell network or the neutral host network. The macro-cell network may include a first long-term evolution radio access network supporting radio communication with an external network via one or more macro-cell evolved nodes. Moreover, the neutral host network may include a second long-term evolution radio access network supporting radio communication with the external network via one or more neutral host evolved nodes. In some examples, the macro-cell network is deployed by a mobile network operator and the neutral host network is deployed by an entity separate from the mobile network operator. In additional examples, the neutral host network supports multiple carriers from several different mobile network operators.

In some implementations, the measurement configuration contains one or more measurement triggers that cause the modem to transmit the measurement report to the data processing hardware. At least one of the measurement triggers may include a switch-request trigger that is satisfied when a quality of the second network exceeds a quality of the first network by a quality threshold.

Receiving the measurement report from the modem may include receiving a switch-request report from the modem when the switch-request trigger is satisfied. Moreover, determining whether it is feasible for the modem to perform the network switch may be further based on at least one of cell load on the second network, backhaul load on the second network, or an ability for the second network to support voice calls. In some examples, determining whether it is feasible for the modem to perform the network switch is further based on at least one of a geographic position of the user device, movement by the user device, signal strength from other radios, or currently active software applications executing on the data processing hardware. The method may also include receiving, at the data processing hardware, a switching report message from the modem, the switching report message indicating whether or not the network switch was a success or a failure.

Another aspect of the disclosure provides a system configured for wireless communication. The system includes a first network in communication with an external network, a second network in communication with the external network, and a user device configured for dual connectivity to the first network and the second network. The user device communicates with the external network when connected to the first network or the second network. The user device includes data processing hardware and memory hardware in communication with the data processing hardware. The memory hardware stores instructions that when executed on the data processing hardware cause the data processing hardware to perform operations. The operations include: receiving one or more data packets from the external network when the user device connects to the first network; transmitting a measurement configuration to a modem of the user device; receiving a measurement report from the modem, the measurement report based on the transmitted measurement configuration; and determining whether it is feasible for the modem to perform a network switch to connect the user device to the second network based on the received measurement report. When it is feasible for the modem to perform the network change, the operations include transmitting a network change command to the modem, the network change command causing the modem to perform the network switch to connect the user device to the second network.

This aspect may include one or more of the following optional features. In some implementations, the first network includes one of a macro-cell network or a neutral host network and the second network comprises the other one of the macro-cell network or the neutral host network. The macro-cell network may include a first long-term evolution radio access network supporting radio communication with an external network via one or more macro-cell evolved nodes. Moreover, the neutral host network may include a second long-term evolution radio access network supporting radio communication with the external network via one or more neutral host evolved nodes. In some examples, the macro-cell network is deployed by a mobile network operator and the neutral host network is deployed by an entity separate from the mobile network operator. In additional examples, the neutral host network supports multiple carriers from several different mobile network operators.

In some implementations, the measurement configuration contains one or more measurement triggers that cause the modem to transmit the measurement report to the data processing hardware. At least one of the measurement triggers may include a switch-request trigger that is satisfied when a quality of the second network exceeds a quality of the first network by a quality threshold.

Receiving the measurement report from the modem may include receiving a switch-request report from the modem when the switch-request trigger is satisfied. Moreover, determining whether it is feasible for the modem to perform the network switch may be further based on at least one of cell load on the second network, backhaul load on the second network, or an ability for the second network to support voice calls. In some examples, determining whether it is feasible for the modem to perform the network switch is further based on at least one of a geographic position of the user device, movement by the user device, signal strength from other radios, or currently active software applications executing on the data processing hardware. The operations may also include receiving, at the data processing hardware, a switching report message from the modem, the switching report message indicating whether or not the network switch was a success or a failure.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
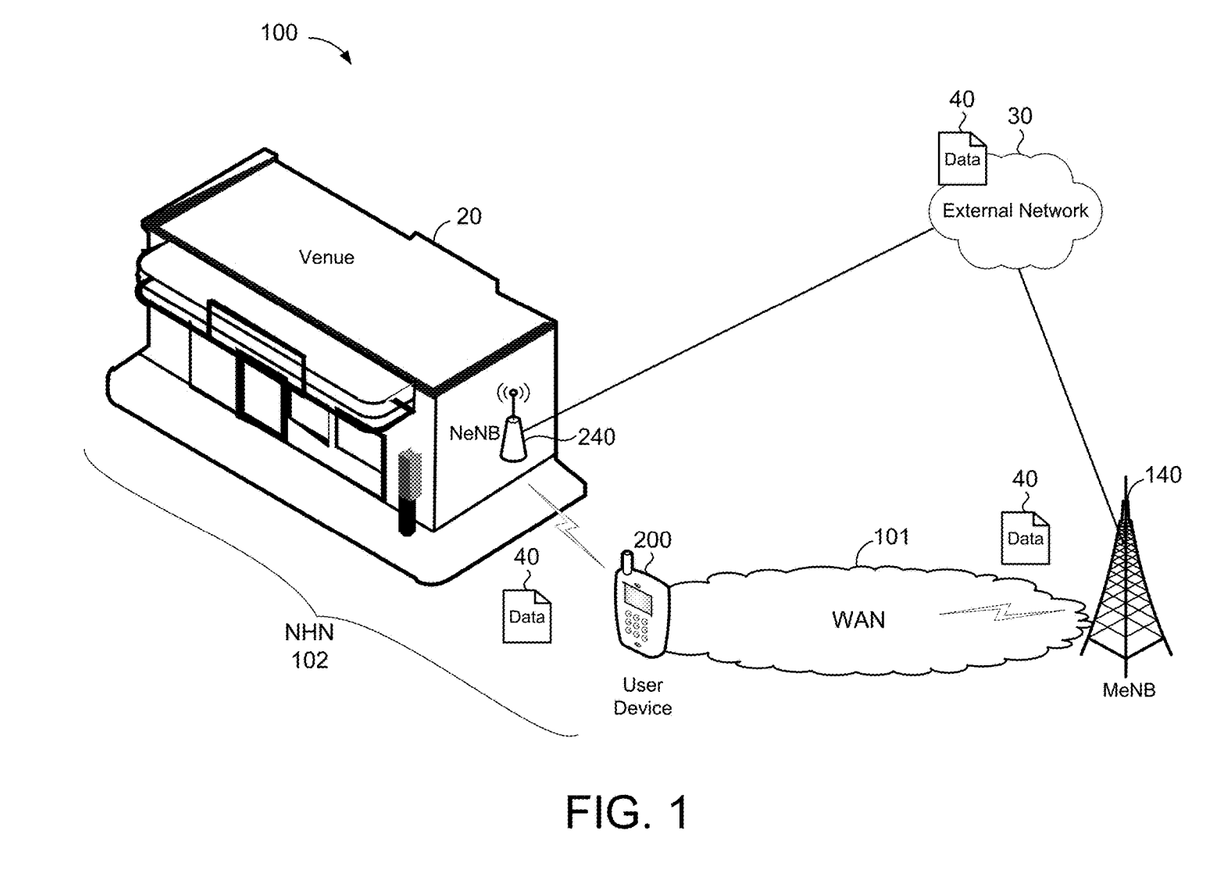
FIG. 1 is a schematic view of an example wireless network for providing a user device dual access to a macrocell network and a neutral host network.

Referring to FIG. 1, in some implementations, a wireless communication environment 100 includes a user device 200 in communication with an external network 30 (e.g., Packet Data Network (PDN)) through a macro-cell network (MCN) 101 or a neutral host network (NHN) 102. In some examples, the MCN 101 and the NHN 102 each include a corresponding Long-Term Evolution (LTE) radio access network (RAN) to support radio communication of data packets 40 and/or other services from the external network 30 to the user device 200 via one or more macro-cell evolved Node B's (MeNB) 140 and/or one or more neutral-host evolved Node B's (NeNB) 142.

The MCN 101 and the NHN 102 may be independently operated, such that the MCN 101 is associated with a mobile network operator (MNO) that provides services of wireless communications to subscribing user devices 200, while an entity separate from the MNO deploys and administers the NHN 102 for meeting coverage needs by the entity. For instance, an entity or enterprise associated with a venue 20 may deploy a NeNB 142 at or near the venue 20 to improve indoor LTE RAN coverage by providing the NHN 102 to connect the user device 200 to the external network 30. Thus, the NHN 102 may improve indoor LTE RAN coverage within the venue 20 in scenarios when the MCN 101 is insufficient for connecting the user device 200 to the external network 30. In some scenarios, the NHN 102 supports multiple carriers from several different MNOs. In other scenarios, the NHN 102 corresponds to a small-cell network and the user device 200 subscribes to the NHN 102. For instance, the NHN 102 may serve as an extended coverage area for the MCN 101 run by the MNO.

Each eNB 140, 142 includes a device that communicates with the user device 200 using analogue and digital signal processing functions of an LTE air interface. Each eNB 140, 142 may also be referred to as a base station or an access point for providing communication coverage for a particular geographic area and supporting radio communication for the user device 200 located within the coverage area. Here, the NeNB 142 associated with the NHN 102 provides a smaller coverage area than the MCN 101 serviced by the MeNB 140. Similarly, the NeNB 142 associated with the NHN 102 may serve as an extension of the MNO.

Generally, when a user device 200 moves about a MCN 101 run by the MNO during connected-mode mobility in LTE, the MeNBs 140 deployed by the MNO make mobility decisions and instruct the user device 200 to initiate handovers from a source MeNB 140 to a target MeNB 140 when the user device 200 moves in proximity to the target MeNB 140. Here, the handover results in a switch within a same network type, e.g., switching from one LTE base station (e.g., MeNB) to another LTE base station, or in a switch across different network types controlled by the same MNO, i.e., switching from one LTE base station to another base station providing a Global System for Mobile Communications (GSM) network. In some implementations, the MCN 101 and the NHN 102 are independently operated from one another, use different public land mobile networks (PLMNs), and share a common subscription/Subscribing Identity Module (SIM). In these implementations, the user device 200 supports dual connectivity to the two LTE networks 101, 102 and controls inter-RAN switching therebetween without any joint planning or RAN-level coordinated parameter tuning between the two networks 101, 102. Accordingly, as the two LTE networks 101, 102 are independently operated, and are therefore likely to have different administration and management systems, the user device 200 is configured to implement the mobility decisions for switching between the two LTE networks 101, 102.

Figure 2:
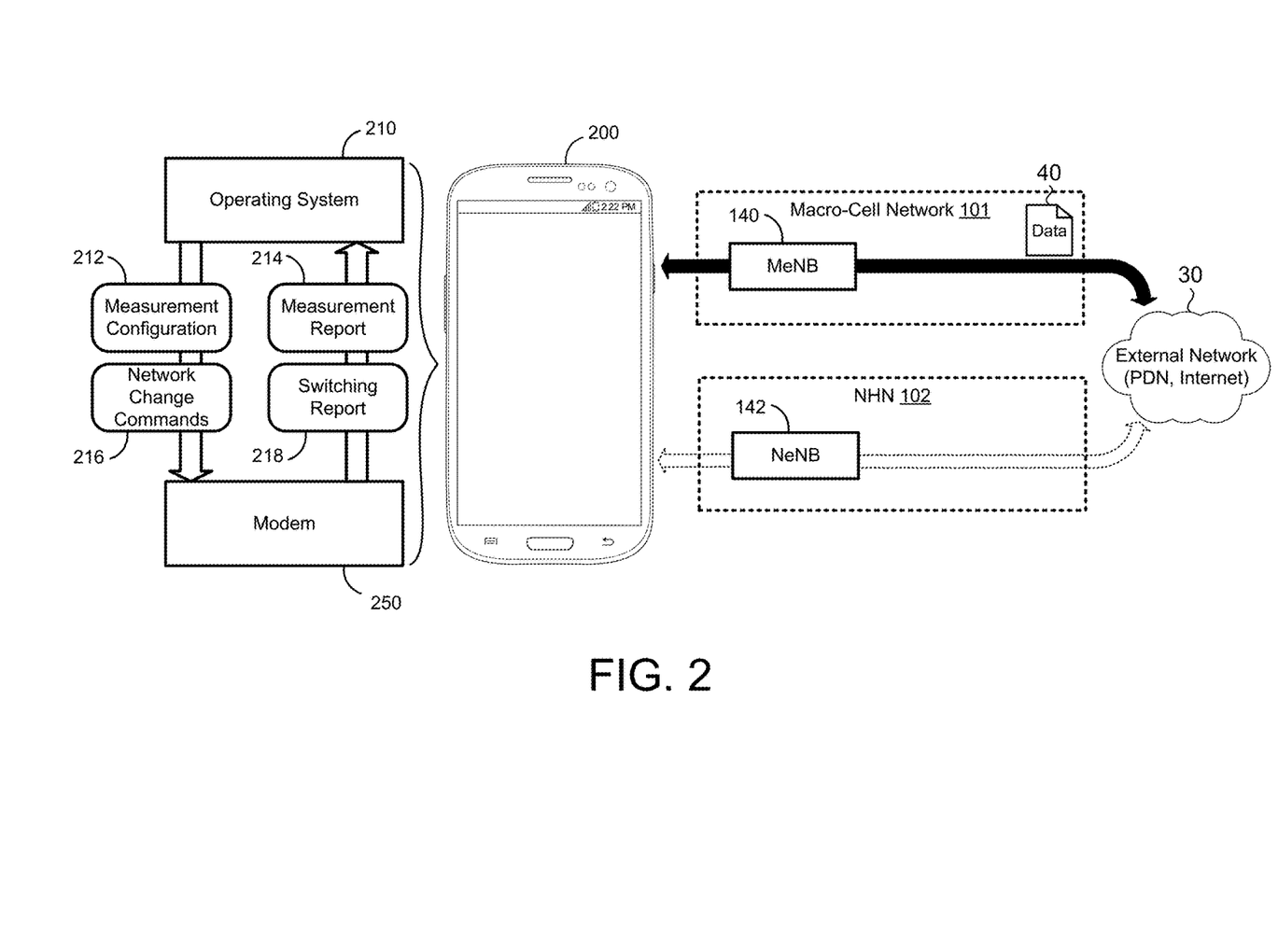
FIG. 2 is a schematic view of an example user device having an operating system and modem in communication with one another to control switching between a macro-cell network and a neutral host network.

FIG. 2 shows an example user device 200 supporting dual connectivity to the MCN 101 and the NHN 102. User devices 200 can be any computing devices that are capable of wireless communications with the eNBs 140, 142 over the LTE interface. User devices 200 include, but are not limited to, mobile computing devices, such as laptops, tablets, smart phones, and wearable computing devices (e.g., headsets and/or watches). The user device 200 includes a modem 250 capable of wirelessly communicating with the eNBs 140, 142 over the LTE interface and data processing hardware 600 (FIG. 3) executing an operating system 210.

User devices 200 may use a variety of different operating systems 210. In examples where a user device 200 is a mobile device, the user device 200 may run an operating system including, but not limited to, ANDROID® developed by GOOGLE INC., IOS® developed by APPLE INC., or WINDOWS PHONE® developed by MICROSOFT CORPORATION. Accordingly, the operating system 210 running on the user device 200 may include, but is not limited to, one of ANDROID®, IOS®, or WINDOWS PHONE®. In some examples a user device may run an operating system including, but not limited to, MICROSOFT WINDOWS® by MICROSOFT CORPORATION, MAC OS® by APPLE INC., or LINUX. User devices 200 may also support dual connectivity to the LTE networks 101, 102 while running operating systems 210 other than those operating systems 210 described above, whether presently available or developed in the future.

In some implementations, the user device 200 implements the mobility policy to facilitate switching to and from the LTE networks 101, 102 by partitioning mobility-related operations between the modem 250 and the operating system 210 executing on the user device 200. For instance, the user device 200 can make mobility decisions in a power-efficient manner based on signal quality information from the modem 250 coupled with geographic position information from the operating system 210. In some examples, the operating system 210 sends measurement configuration messages 212 to the modem 250 and receives measurement report messages 214 from the modem 250. The measurement configuration messages 212 configure measurement reporting by the modem 250 and may contain instructions that update measurement objects, reporting configurations, and measurement identifies similar to the measurement configurations between a base station (e.g., MeNB 140) and the user device 200 as specified by the $3^{rd}$ Generation Partnership Project (3GPP) in 3GPP TS 36.331, Section 5.5.2. The measurement configurations may include various options including, but not limited to: Evolved Universal Terrestrial Radio Access Absolute Radio Frequency Channel Number (EARFCN) information of the channel on which to take measurements; measurement types, including threshold-based measurements, periodic measurements, and a special type of measurement called a report CGI measurement; trigger types for a corresponding measurement report, which fall into several categories such as A1, A2 triggers and B1, B2 triggers; and/or parameters for the triggers, including, but not limited to, Time to Trigger (TTT), Hysteresis, and Cell Individual Offsets (CIO). The measurement report messages 214 from the modem 250 correspond to measurements reported by the modem 250 based on the measurement configuration messages 212 sent from the operating system 210 to the modem 250. For instance, the modem 250 may send the measurement report message 214 when a trigger condition specified in the measurement configuration message 212 occurs. A measurement trigger may include a proximity trigger indicating a proximity of the user device 200 in relation to a target network. A measurement trigger may additionally or alternatively include a switch-request trigger that is satisfied when a quality of the target network exceeds a quality of the source network by a threshold. A measurement trigger may also include an early-warning trigger that is satisfied when quality of the target network exceeds a quality of the source network by a different threshold than the threshold associated with the switch-request trigger.

In some examples, the operating system 210 sends network change commands 216 to the modem 250 to command the mobile device 200 to change from one of the LTE networks 101, 102 to the other one of the LTE networks 101, 102. The operating system 210 may send the network change command 216 based on information contained in measurement report messages 214 received from the modem 250. Additionally or alternatively, the operating system 210 may send the network change command 216 based on suitability of the target cell for handover. The operating system 210 may determine the suitability of the target cell for handover using criteria such as cell load on the target network, backhaul load on the target network, and/or the target network's ability to support voice calls; whether or not the user device is authorized to use the target network. Additional or alternative criteria include: an active versus idle status of the modem 250 on the current network; information about a context of the mobile device, such as position of the device 200, movement (e.g., from accelerometers) of the user device 200, signal strength from other radios such as WiFi radios, and/or currently active applications 302 executing on the user device; and/or an output of trained machine-learning algorithm using any of the foregoing parameters.

In some implementations, the certified NHN application 302 executing on the operating system 210 uses reporting capabilities of the user device to develop a set of network switching behaviors. Examples of reporting capabilities include: geofencing to define boundaries for the networks 101, 102; user device movement velocity or type (e.g., pedestrian, car bicycle); user history indicating times and frequencies of when user device 200 visits a specific location; history of past switching failures and successes (e.g., contained in the switching report message 218); signal quality of other wireless signals such as WiFi signals or Bluetooth LE beacons (which are correlated with position and can work better than GPS to distinguish indoor vs. outdoor); admission control based on network identifiers, such as a Neutral Host Identifier, Tracking Area Identifier, Closed Subscriber Group Identifier, or Evolved Universal Terrestrial Radio Access Network Cell Global Identifier (ECGI) received from one of the eNBs 140, 142; admission control based on load of target eNB 140, 142; load information transferred over-the-top, either by issuing a just-in-time query or via a cloud pub-sub service or via cached information; and/or machine learning algorithms.

Additionally or alternatively, the operating system 210 may receive a switching report message 218 from the modem 250 indicating network conditions when the user device 200 transitions between the LTE networks 101, 102 and whether or not the switch was a success or a failure. In some examples, the modem 250 needs to at least enter into a connected mode to register the transition from one LTE network 101, 102 to another. Otherwise, incoming data 40, e.g., from the external network 30, will not route through the correct LTE network 101, 102. The switching report message 218 may also contain a mobility history indicating the identities of the visited eNBs 140, 142, amount of time spent in each network 101, 102, and/or boundaries between the two LTE networks 101, 102 when user device 200 performs a switch. In some scenarios, the modem 250 sends the switching report message 218 to the operating system 210 automatically during each idle-mode network switch. In other scenarios, the operating system 210 requests the modem 250 to send the switching report message 218. In these scenarios, battery power is conserved at the user device 200, since the data processing hardware 600 does not need to be awakened for receiving the switching report message 218 from the modem 250 on every idle-mode mode network switch.

As the user device 200 is configured to control inter-RAN switching between the two LTE networks 101, 102 by partitioning mobility-related operations between the modem 250 and the operating system 210, the modem 250 exposes a neutral host network application programming interface (NHN API 322) (FIG. 3) to allow for communications (e.g. messages 212, 214, 216, 218) between the modem 250 and the operating system 210. This NHN API 322 may be similar to a different API the modem 250 uses to communicate with MeNBs 140 employed by the MNO in the partition of connected-mode mobility management between the user device 200 and a given MeNB 140. In some implementations, the NHN API 322 allows the modem 250 to store mode-dependent configurations for reducing the amount of communication between the modem 250 and the operating system 210.

User devices 200, such as smartphones, typically include several components that cooperate to provide wireless service. These components may include a radio frequency (RF) module, a baseband modem 250, data processing hardware 600 (e.g., a processor), and the operating system 210 executing on the data processing hardware. The modem 250 may include its own processing capabilities and/or memory hardware. Different vendors may build these components and time scales for updating these components may vary widely. For instance, the RF module and the modem 150 may be built by a system on a chip vendor with associated firmware that is rarely, if ever, updated. Conversely, the operating system 210 may be built by a different vendor and may update frequently. As a general rule, the vendor responsible for building a particular component is best suited for optimizing power within that component.

Figure 3:
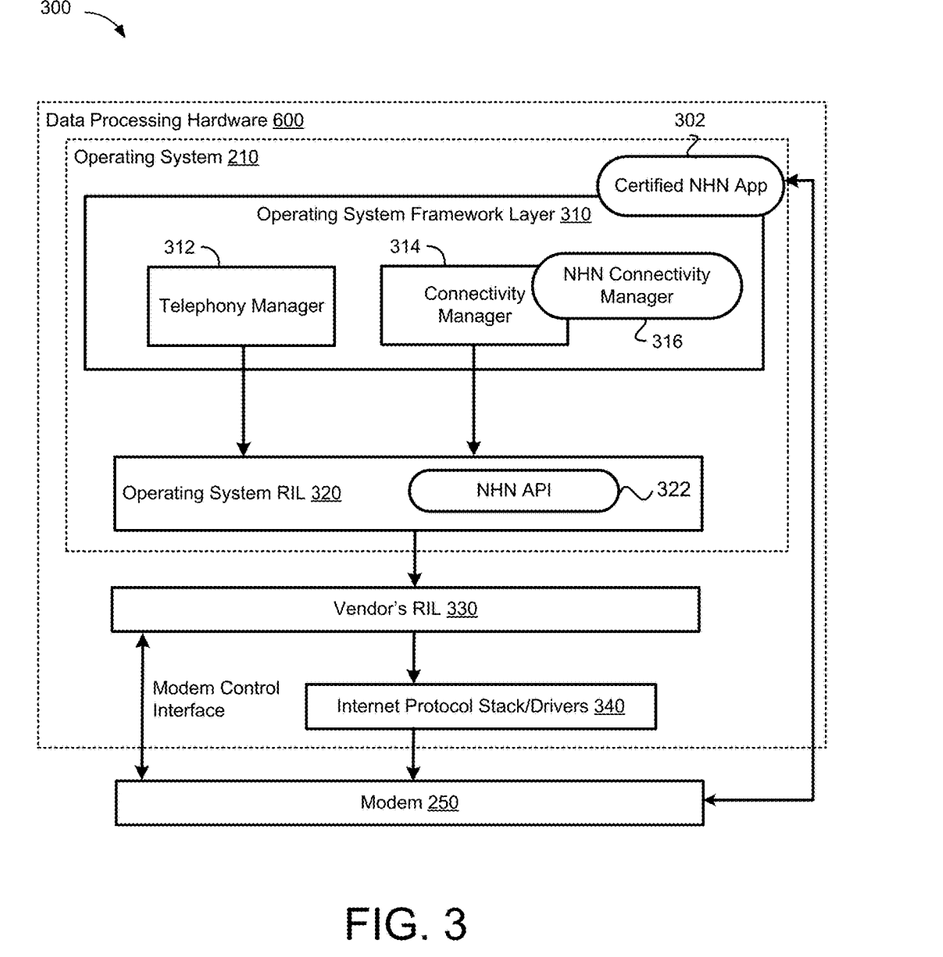
FIG. 3 is a schematic view of an example system architecture for a user device including an application programming interface for facilitating communications between an operating system and a modem of the user device.

FIG. 3 is a schematic view 300 of an example system architecture of the user device 200 including the NHN API 322 for facilitating communications between the operating system 210 and the modem 250, which may be built by different vendors. The operating system 210 may execute one or more software applications 302. A software application 302 may refer to computer software that, when executed by the data processing hardware 600, causes the data processing hardware 600 to perform. In some examples, the software application 302 may be referred to as an "application", an "app", or a "program". Example software applications 302 include, but are not limited to, word processing applications, spreadsheet applications, messaging applications, media streaming applications, social networking applications, and games.

Applications 302 can be executed on a variety of different user devices 200. In some examples, applications 302 are installed on the user device 200 prior to purchase of the user device 200. In other examples, a user associated with the user device 200 may download and install applications 302 on the user device 200.

In some implementations, the operating system 210 executes a certified NHN application 302 that supports connectivity to the NHN 102 by establishing a wireless communication with a corresponding NeNB 142. An entity may employ the NHN 102 at a specific venue 20 and the entity may offer the certified NHN application 302 for download by the user device 200 to enable connectivity to the NHN 102. For instance, the certified NHN application 302 may provide pertinent information to the NeEB 142 related to the user device 200 for gaining access to the NHN 102. In other configurations, the certified NHN application 302 may be pre-installed on the user device 200.

In some implementations, the certified NHN application 302 executing on the operating system 210 uses reporting capabilities of the user device to develop a set of network switching behaviors. Examples of reporting capabilities include: geofencing to define boundaries for the networks 101, 102; user device movement velocity or type (e.g., pedestrian, car bicycle); user history indicating times and frequencies of when user device 200 visits a specific location; history of past switching failures and successes (e.g., contained in the switching report message 218); signal quality of other wireless signals such as WiFi signals or Bluetooth LE beacons (which are correlated with position and can work better than GPS to distinguish indoor vs. outdoor); admission control based on network identifiers, such as a Neutral Host Identifier, Tracking Area Identifier, Closed Subscriber Group Identifier, or Evolved Universal Terrestrial Radio Access Network Cell Global Identifier (ECGI) received from one of the eNBs 140, 142; admission control based on load of target eNB 140, 142; load information transferred over-the-top, either by issuing a just-in-time query or via a cloud pub-sub service or via cached information; and/or machine learning algorithms.

The system architecture of the user device 200 includes an operating system framework layer 310, an operating system radio interface layer (OS RIL) 320, a vendor's RIL 330, Internet Protocol (IP) stack/drivers 340, and lastly a hardware layer that includes the modem 250. The certified NHN application 302 may reside in an application layer (not shown) above the framework layer 310. The application layer may include other software applications, such as native applications (e.g., web browser and email applications) as well as third party applications installed by the user device 200. The framework layer 301, the OS RIL 320, the vendor's RIL 330, and the IP stack/drivers 340 may each execute as software (e.g., software stack) on the data processing hardware 600 and serve as abstraction layers between the operating system 210 and the modem 250. Moreover, the framework layer 310 and the OS RIL 320 may run on the operating system 210, while the Vendor's RIL 330 and the IP stack/drivers 340 may include firmware associated with a vendor that built the modem 250. As such, the operating system 210 and the modem 250 may be built by different vendors. Generally, the operating system 210 updates frequently while the associated firmware of the RIL 330 and IP stack/drivers 340 for the modem 250 update rarely or never update.

The framework layer 310 provides a set of one or more services that collectively form the environment for running and managing the operating system 210 and software applications 302 (e.g., the certified NHN application 302) executing thereon. The framework layer 310 may include a telephony manager 312 for providing information to the operating system 210 about telephony services available on the user device 200 such as status and subscriber information. The framework layer 310 also includes a connectivity manager 314 for executing handovers from one base station to another base station of the same wireless network 101. In some implementations, the connectivity manager implements a NHN connectivity manager 316 that performs switching decisions to transition the user device 200 from one of the LTE networks 101, 102 to the other one of the LTE networks 101, 102.

The OS RIL 320 and the Vendor's RIL 330 collectively provide an RIL interface that provides an abstraction layer between the operating system framework layer 310, i.e., the telephony manager 312 and the NHN connectivity manager 316, and radio hardware such as the modem 250. The RILs 320, 330 are radio agnostic and include support for both LTE-based radios and GSM-based radios. In some examples, the OS RIL 320 initializes the Vendor's RIL 330, processes all communications from the telephony and connectivity managers 312, 314, 316, and dispatches calls to the Vendor's RIL 330 as solicited commands. The Vendor RIL 330, on the other hand, processes all communication with the modem 250 (e.g., radio hardware) and dispatches calls to the OS RIL 320 through unsolicited commands. As such, the Vendor's RIL 330 provides a modem control interface with the modem 250

In some implementations, the OS RIL 320 implements the NHN API 322 to expose information and controls from the NHN API 322 to the NHN connectivity manager 316, thereby enabling the NHN connectivity manager 316 to make the switching decisions for transitioning the user device 200 between the two LTE networks 101, 102. In some examples, the operating system 210 additionally exposes the same information and controls from the NHN API 322 to one or more software applications 302 executing thereon. In these examples, the operating system 210 may verify which applications 302 can receive information through standard application functionality such that the operating system 210 only exposes the NHN API 322 to applications 302 signed with certain private keys. While the example shows the NHN API 322 communicating with the modem 250 via the OS RIL 320 and the Vendor's RIL 330, other configurations may include connecting the NHN API 322 directly to the modem 250 through proprietary interfaces to effectively bypass the network stack. For instance, Qualcomm® mobile station modems interface (QMI) may connect the NHN API 322 directly to the modem 250.

The IP stack/drivers 340 provide a level of abstraction between the modem 250 and the upper layers 310, 320, 330 of the software stack executing on the data processing hardware 600. The stack/drivers 340 may provide preemptive multitasking, low-level core system services such as memory, and process and power management for implementing the network stack as well as drivers for radio hardware such as the modem 250. In some examples, a Linux Kernel is associated with the IP stack/drivers 340.

By extending the OS RIL 320 to include the NHN API 322, the NHN API 322 permits protected communications (e.g., messages 212, 214, 216, 218) between the operating system 210 and the modem 250 to enable the user device 200 to make switching decisions for transitioning between the two LTE networks 101, 102. In some examples, the NHN API 322 allows the operating system 210 to set network preferences to enable/disable the NHN 102 and to allow power optimization when the user device 200 is known to be ineligible for or distant from the NHN 102. Additionally or alternatively, the NHN API 322 may set switching policy preferences that tune logic used by the modem 250 for inter-RAN switching between the networks 101, 102. In some examples, the NHN API 322 queries a state of the modem 250 on each network context. For instance, the NHN API 322 may query the modem 250 to determine if the modem's state is idle/connected and/or registered/deregistered.

By default, network selection is driven by policy logic of the modem 250. In some implementations, the NHN API 322 allows the policy logic to be suspended in favor of a fixed selection. When the selection of the network is fixed, the modem 250 may preserve power by stopping all switching-related logic for the unused network. However, the modem 250 will not discontinue radio quality reports or other certain measurement activities to support configured reports (if any). Table 1 below shows the NHN API 322 configured to set the preferred network (QMI_SET_PREFERRED_NETWORK) where the NetworkName=AUTO reverts the fixed selection to the default modem policy logic. The NetworkName=MCN refers to the preferred network set to the MCN 101 and the NetworkName=NHN refers to the preferred network set to the NHN 102.

TABLE 1

SET_PREFERRED_NETWORK

| Element name | Values |
|---|---|
| NetworkName | {NHN, MCN, AUTO} |

In some implementations, the NHN API 322 tunes the policy of the modem 250 to autonomously select the preferred network, i.e., the preferred network set by selecting one of the values NHN, MNO, AUTO from Table 1. The NHN API 322 provides separate selection policies for switching from the MCN 101 to the NHN 102 and for switching from the NHN 102 to the MCN 101. As used herein, a "NHN selection policy" refers to the selection policy for switching from the MCN 101 to the NHN 102, and a "MCN selection policy" refers to the selection policy for switching from the NHN 102 to the MCN 101. Additionally, the NHN API 322 provides separate controls for "connected" versus "idle" mode behavior.

The NHN selection policy is shown in Table 2 below (SET_NETWORK_PLICY_MCN_TO_NHN). Here, the NHN API 322 provides SIB5-like reselection parameters from the operating system 210 to the modem 250 to allow for tuning of the NHN selection policy without having to reconfigure the MeNBs 140 of the MCN 101, and to adjust the switching policy based upon a context of the user device 200, such as geofencing. These SIB5-like, or supplemental SIB5 parameters, may contain idle-mode parameters that pertain to the frequencies associated with the target network 101, 102. To the extent that these parameters conflict with the ones the serving network 101, 102 provides, the serving network may maintain priority. In some examples, the NHN selection policy also configures the modem 250 for full-band NHN 102 scanning (as opposed per-EARFCN scanning) and the ability for the modem 250 to whitelist/blacklist PLMNs and NHN-IDs.

TABLE 2

SET_NETWORK_SELECTION_POLICY_MCN_TO_NHN

| Element name | Values |
|---|---|
| NHNScanConfiguration | [Bands, PLMN, NHIDs, etc.] |
| NHNSelectionParametersIdle | [SIB5 parameters for NHN bands, while MCN Idle and Primary] |
| NHNSelectionParametersConnected | [SIB5 parameters for NHN bands, while MCN Connected and Primary] |

The MCN selection policy is shown in Table 3 below (SET_NETWORK_PLICY_NHN_TO_MCN). Here, the NHN API 322 overrides any SIB5-like parameters the NeNB 142 uses to allow for adjusting of the switching policy based upon the context (e.g., geofencing) of the user device 200, such as geofencing.

TABLE 3

SET_NETWORK_SELECTION_POLICY_NHN_TO_MCN

| Element name | Values |
|---|---|
| MCNSelectionParametersIdle | [SIB5 parameters for selection to MCN, while NHN Idle and Primary] |
| MCNSelectionParametersConnected | SIB5 parameters for selection to MCN, while NHN Connected and Primary] |

In some configurations, the NHN API 322 queries a current state of the modem 250 and the modem 250 reports the state back the NHN API 322 via callback. Table 4 below provides the configuration for the state report that the NHN API 322 sends to the modem 250 when querying the current state thereof. The values for the StateReportTrigger of Table 4 generally indicate trigger conditions for when the modem 250 is permitted to "wake-up" the operating system 210 to report the state back to the operating system 210. The NHN API 322 executing by the operating system 210 may provide the configuration for the state report to the modem 250 via the measurement configuration message 212.

TABLE 4

CONFIGURE_NETWORK_STATE_REPORT

| Element name | Values |
|---|---|
| StateReportTrigger | Bitmap of trigger conditions: Immediate, MCNStateChange, NHNStateChange, PrimaryNetworkChange, SwitchFailure |
| ReportEnabled | {Enabled, Disabled}: used to temporarily deactivate a report |
| ReportId | Integer handle provided by caller, echoed on callback |
| ReportAction | {Add, Modify, Delete} 9tied to ReportId) |
| Callback | [callback handle] |

Table 5 below provides an example state report the modem 250 reports back to the NHN API 322 via the callback. The state includes a switch report indicating one of a failure or a success associated with a most recent switch decision between the two LTE networks 101, 102. The NHN connectivity manager 316 may obtain the current state of the modem 250 from the NHN API 322 for detecting one of an early switch decision, a late switch decision, or a wrong switch decision. In some examples, the switch report contains a sequence number so the NHN API 322 can determine if the switch report is new. The modem 250 may provide the switch report to the operating system 210 via the switching report message 218 when a StateReportTrigger specified by the configuration for the state report (Table 4) occurs.

TABLE 5

NETWORK_STATE_REPORT

| Element name | Values |
|---|---|
| NHNIdentity | [PLMN, NHN-ID, ECGI, CSG, TAC] |
| NHNRrcState | {IDLE, CONNECTED} |
| NHNEmmState | {REGISTERED, DEREGISTERED} |
| MCNIdentity | [PLMN, ECGI, CSG, TAC] |
| MCNRrcState | {IDLE, CONNECTED} |
| MCNEmmState | {REGISTERED, DEREGISTERED} |
| PrimaryNetwork | {NHN, MNO} |
| SwitchReport | [RF measurements at time of switch, trigger condition that caused switch, source eNB, target eNB, final eNB, sequence number] |
| ReportId | Integer handle provided by caller, echoed on callback |

In some implementations, the modem 250 provides radio quality reports via callback when certain radio conditions are present. For instance, the measurement report message 214 sent from the modem 250 to the operating system 210 may provide a radio quality report. A radio quality measurement may include one or more configuration inputs such as band and EARFCN information, NHN/CSG information, associated radio quality measurements to be reported (i.e., Reference Signal Received Power (RSRP) and/or Reference Signal Received Quality (RSRQ)), and/or frequency repetition count of reports. Radio quality reports allow context-dependent configuration of switching policy. For instance, by using a suitable radio quality notification, the NHN API 322 can instruct the modem 250 to disable discovery of the of the NHN 102 until the signal quality of the MCN 101 drops below a signal quality value and user device 200 is within a geofenced area. Table 6 below provides a configuration for the quality report that the NHN API 322 sends to the modem 250 (CONFIGURE_NETWORK_QUALITY_REPORT). The operating system 210 (e.g., via the NHN API 322) may send the configuration for the quality report in the measurement configuration message 212. The EventMode indicates that callbacks from the modem 250 to the operating system 210 will trigger when the modem 250 is in a selected Radio Resource Control (RRC) mode: {RrcIdle, RrcConnected, RrcAny}.

TABLE 6

CONFIGURE_NETWORK_QUALITY_REPORT

| Element name | Values |
| --- | --- |
| RAdioQualityObject1 | [Bnd, PLMN, NHID] |
| EventType | {A1, A2, B1, B2} |
| EventConfig | {periodic, reportStrongest, reportCGI, etc.} |
| EventMode | Callbacks will be tgriggered when the modem is in the selected RRC mode: {RrcIdle, RrcConnected, RrcAny} |
| MeasurementConfig | [threshold, offset, TTT, hysteresis, CIO] |
| ReportEnabled | {Enabled, Disabled}: used to temporarily deactivate a report |
| ReportId | Integer handle provided by caller, echoed on callback |
| ReportAction | {Add, Modify, Delete} 9tied to ReportId) |
| Callback | [callback handle] |

Generally, reports of EventType=A1 or A2 involve only the MCN 101 and are expected to cause minimal impact on modem load. Conversely, reports of EventType=B1 or B2 require scans of inter-frequency neighbors, and as a result, may increase modem load. However, the modem 250 may only perform these measurements to the extent that the modem has an opportunity to do so. Accordingly, reports of EventType=B1 or B2 may support full-band scanning.

Measurement identities exposed between the operating system 210 and the modem are kept in a separate numbering space by the NHN API 322 than the measurement identities used between user device 200 and a MeNB 140. This allows the two configurations for performing measurements can operate independently from one another.

Figure 4:
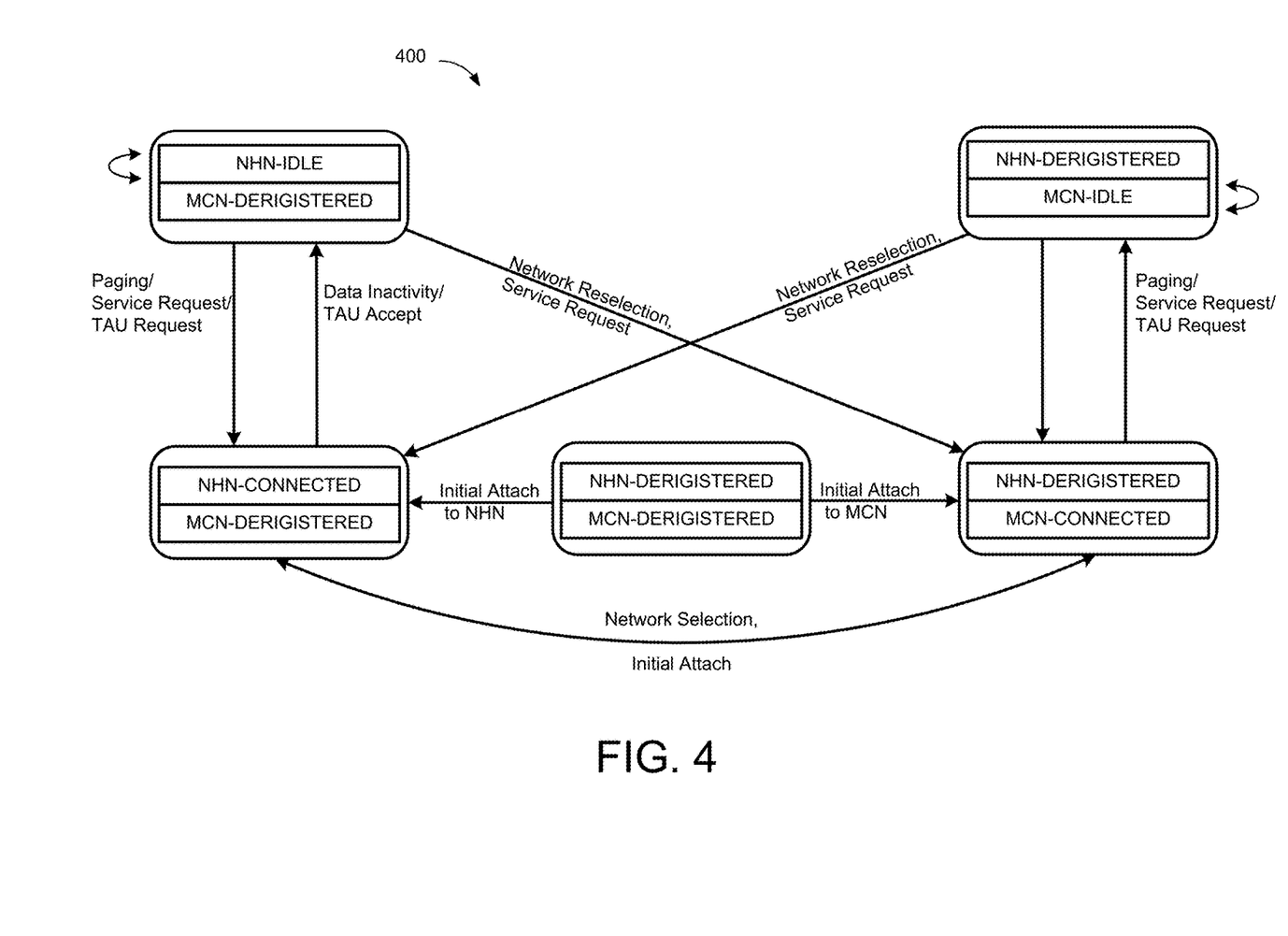
FIG. 4 is a schematic view showing a state chart for a user device supporting only one LTE network registration at a time.

Referring to FIG. 4, a schematic view 400 shows a state chart for a user device 200 supporting only one LTE network registration at a time. Here, the user device 200 supports the NHN 102 in a single-context. When the user device 200 switches between the two LTE networks 101, 102, the user device 200 must first register on the new network, thereby causing an automatic deregistration on the previous network. As the state chart shows no direct transition from RRC-Idle on one network 101, 102 to RRC-Idle on the new network 101, 102, the user device 200 must first pass through RRC-Connected on the new network via an initial attach process before dropping back to RRC-Idle mode on the transitioned to network 101, 102.

In some implementations, the user device 200 generates a PDN connectivity request when executing the initial attach procedure for switching between the MCN 101 and the NHN 102 in either direction. In these implementations, the user device 200 sets the Request type to "Handover" to instruct a PDN gateway (PGW) associated with one of the networks 101, 102 to preserve an IP address of the connection. Here, if the modem 250 determines that the IP address has been preserved after the switch, the modem 250 must not reset the IP interface it exposes to the operating system 210 via the NHN API 322. As set forth above with respect to Tables 1-6, the modem 250 performs, on a best-effort basis, cross-network measurement, reporting, and selection procedures in parallel with the normal LTE idle or connected mode procedures performed on the registered network.

Figure 5:
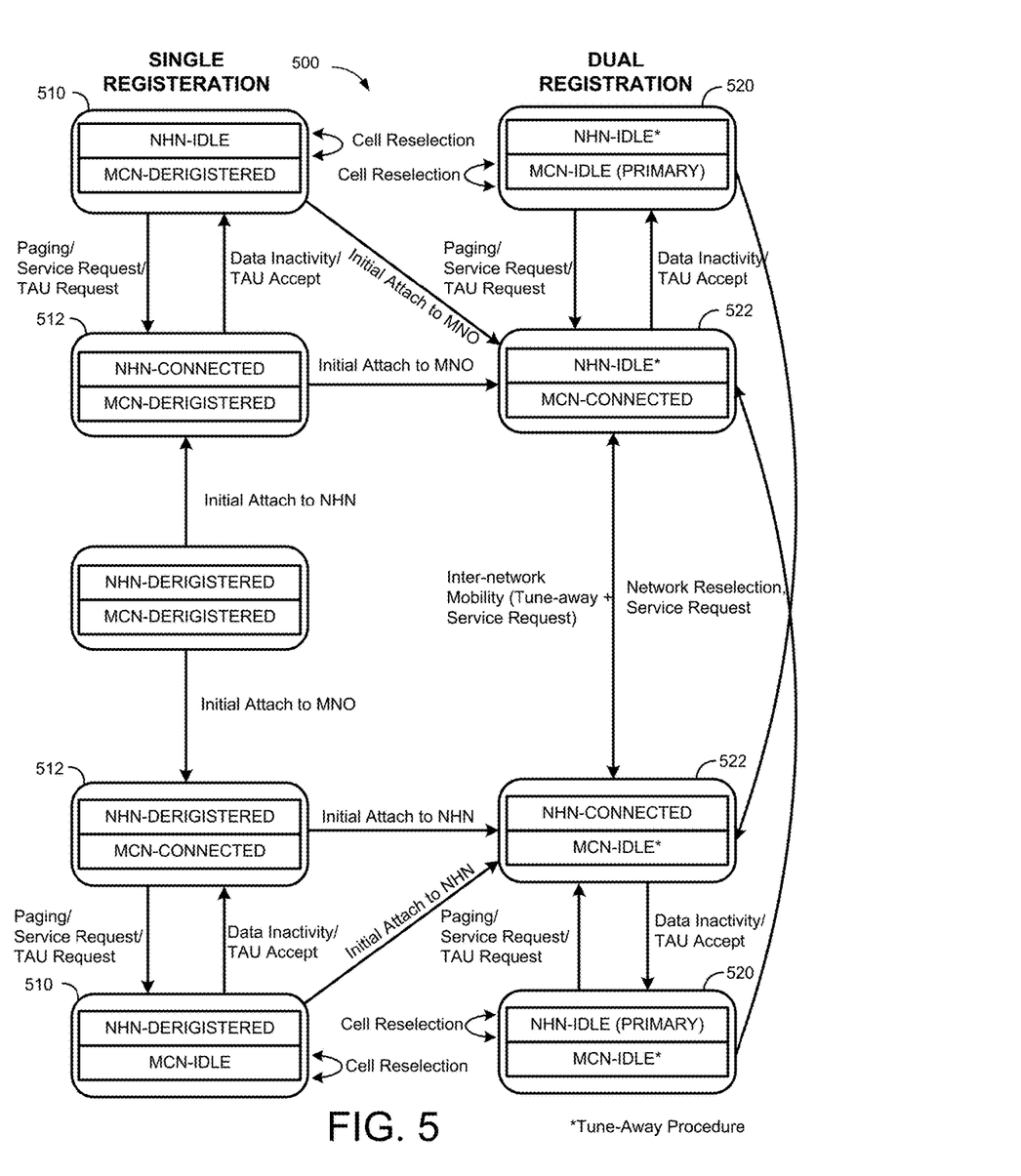
FIG. 5 is a schematic view showing a state chart for a dual context user device supporting dual registration to two LTE networks.

Referring to FIG. 5, a schematic view 500 shows a state chart for a user device 200 supporting a dual-context for simultaneously registering to both the MCN 101 and NHN 102 LTE networks. Here, the user device 200 is optimized for connectivity to the NHN 102 and includes a single radio with dual context support, i.e., one context per network 101, 102, so that the device 200 acts as two logical devices each communicating with one of the two networks 101, 102.

Moreover, the user device 200 may determine which LTE network is currently primary (i.e., used for uplink and downlink user data) when both networks are idle. For instance, the NHN API 322 may influence the determination of the primary network by the modem 250. In order to switch the primary network, i.e., transition from one of the MCN 101 or the NHN 102 to the other one of the MCN 101 or the NHN 102, the user device 102 must exchange control messages with the target network. For this reasoning, the dual-context modem 250 does not include a direct idle-to-idle mode transition of the "primary" designation from one network to the other.

In the Dual Registration mode, the primary network 101, 102 prioritizes access to radio resources such that the user device 200 performs limited procedures on the other network using "tune away" procedures to temporarily take radio resources from the primary network. The modem 250 may be configured to optimize the tune-away procedures. For instance, when both networks 101, 102 are in IDLE states, the user device 200 is configured to use a single radio to monitor both networks 101, 102. Under this scenario, a paging arbitrator in the modem 250 determines the priority if paging occasions overlap. In some examples, the primary network is given at least equal priority or higher priority than the priority of the other network. On the other hand, when one of the networks is in a CONNECTED state, the user device 200 may use OFF periods in a connected mode in Discontinuous Reception (DRX) cycles or measurement gaps (if configured) to tune-away and listen to paging on the other network. In some examples the user device takes advantage of other hardware/radio frequency features if available for listening to paging occasions. For instance, the user device 200 may borrow a diversity antenna or a second receiver when two carrier aggregation is not used on the connected network to listen to paging occasions. The modem 250 may implement any combination of features for monitoring paging occasions on the tune-away network.

FIG. 5 shows an example single registration (SR) IDLE Mode 510 for the user device 200 when the user device is registered and RRC-IDLE on one network (e.g., MCN 101 or NHN 102) and DEREGISTERED on the other network (e.g., MCN 101 or NHN 102). For instance, a first sub-state of the SR-IDLE Mode 510 includes NHN-IDLE and MCN-DEREGISTERED and a second sub-state of the SR-IDLE Mode 510 includes MCN-IDLE and NHN-DEREGISTERED.

The user device 200 (e.g., modem 250) performs normal LTE cell reselection and other idle-mode procedures on the registered network, while a transition to RRC-CONNECTED on the registered network is triggered in conventional ways, including uplink data inactivity, tracking area update (TAU), and paging via downlink data notifications.

Simultaneously, on the deregistered network, the modem 250 performs cross-network measurement, reporting, and selection procedures as configured by the NHN API 322, as shown in Tables 4 and 6, on a best-effort basis. When the modem 250 determines to switch to the deregistered network (e.g., if a trigger condition for the configured policy is met or an explicit preference is indicated to the modem 250), the modem 250 performs an initial attach on the second network and sets the second network to the primary network.

During a SR-CONNECTED Mode 512, the user device 200 is RRC-CONNECTED on one network (e.g., MCN 101 or NHN 102) and DEREGISTERED on the other network 101 or 102. For instance, a first sub-state of the SR-CONNECTED Mode 512 includes NHN-CONNECTED and MCN-DEREGISTERED and a second sub-state of the SR-CONNECTED Mode 512 includes MCN-CONNECTED and NHN-DEREGISTERED.

The user device 200 (e.g., modem 250) performs normal LTE connected-mode mobility procedures and intra-network handovers are managed in the conventional manner based on measurements provided to the user device 200 by the MeNB 140. Transitions by the user device from the SR-CONNECTED Mode 512 to THE SR-IDLE Mode 510 occur in response to commands from the MeNB 140 or a radio link failure (RLF).

Simultaneously, on the deregistered network, the modem 250 performs cross-network measurement, reporting, and selection procedures as configured by the NHN API 322, as shown in Tables 4 and 6, on a best-effort basis. When the modem 250 determines to switch to the deregistered network (e.g., if a trigger condition for the configured policy is met or an explicit preference is indicated to the modem 250), the modem 250 performs an initial attach on the second network and sets the second network to the primary network. In this scenario, the modem state for the original network is set to IDLE, thereby causing the user device 200 to transition to a dual registration (DR) Connected Mode 522 discussed in greater detail below. Thereafter uplink data is redirected to the primary network and any pending uplink data that cannot be redirected is flushed.

Referring to the Dual Registration side of the state chart of FIG. 5, a DR-IDLE Mode 520 occurs when the user device 200 is registered to both networks 101, 102 and is RRC-IDLE on both networks. The user device 200 operating in DR-IDLE Mode 520 additionally designates a primary network such that the arrival of uplink data triggers a transition to RRC-CONNECTED on the primary network. Generally, an evolved packet core (EPC) and user devices 200 are configured to route data (e.g., packets 40) over the primary network 101, 102. During the DR-IDLE Mode 520, the user device 200 (e.g., modem 250) performs conventional LTE cell reselection and idle-mode procedures, including for example, tracking area updates (TAU). As the user device 200 is in an IDLE state on both networks 101, 102 with a single radio, the modem implementation must determine how to resolve paging conflicts, how to minimize the power impact of IDLE mode procedures on both networks, etc.

Generally, the use of signaling radio bearers on the non-primary network does not trigger a change of primary network. For instance, a TAU on the non-primary network may cause the modem state on the non-primary network to be temporarily RRC-CONNECTED while the other network remains primary. Arrival of uplink user data triggers the need for a service request on the primary network.

Moreover, during the DR-IDLE Mode 520, the modem 250 simultaneously performs cross-network measurement, reporting, and selection procedures on both networks as configured by the NHN API 322, as shown in Tables 4 and 6, on a best-effort basis. In some implementations, when the modem 250 determines that the non-primary network 101 or 102 should be made primary (e.g., if a trigger condition for the configured policy is met or an explicit preference is indicated to the modem 250), the modem 250 performs a service request on the non-primary network and sets it to be primary. Here, the modem 250 additionally performs signaling to adjust downlink data routing on the PGW for the primary network. In some examples, uplink user data that arrives during the transition period is queued for transmission until after the switch is complete.

During the DR-CONNECTED Mode 522, the user device 200 is registered to both networks 101, 102, is RRC-CONNECTED on the primary network (e.g., MCN 101 or NHN 102) and IDLE on the other non-primary network 101 or 102. For instance, a first sub-state of the DR-CONNECTED Mode 522 includes NHN-CONNECTED and MCN-IDLE and a second sub-state of the SR-IDLE Mode 510 includes MCN-CONNECTED and NHN-DEREGISTERED.

On the CONNECTED network, the user device 200 performs conventional LTE connected-mode mobility procedures. If the user device 200 returns to IDLE, the primary network remains the network that was most recently CONNECTED with the user device 200. On the IDLE network, the user device 200 performs conventional LTE idle-mode procedures on a best effort (*tune-away procedure) basis. For instance, an ability for the user device 200 to perform an area update on the non-primary network while remaining RRC CONNECTED on the primary network may be implementation dependent. Implementations also include the modem 250 simultaneously performing cross-network measurements, reporting, and selection procedures as configured by the NHN API 322, as shown in Tables 4 and 6, on a best-effort basis.

In some implementations, when the modem 250 determines that the non-primary network 101 or 102 should be made primary (e.g., if a trigger condition for the configured policy is met or an explicit preference is indicated to the modem 250), the modem 250 performs a service request on the non-primary network and sets it to be primary. Here, the modem state for the original network is set to IDLE and uplink data is redirected to the primary network while pending uplink data that cannot be redirected is flushed. The modem 250 additionally performs signaling to adjust downlink data routing on the PGW for the primary network. In some examples, uplink user data that arrives during the transition period is queued for transmission until after the switch is complete. Moreover, any paging requests received from the non-primary network during the transition period should be discharged until the procedure for downlink path adjustment on the PGW completes successfully or is aborted.

Figure 6:
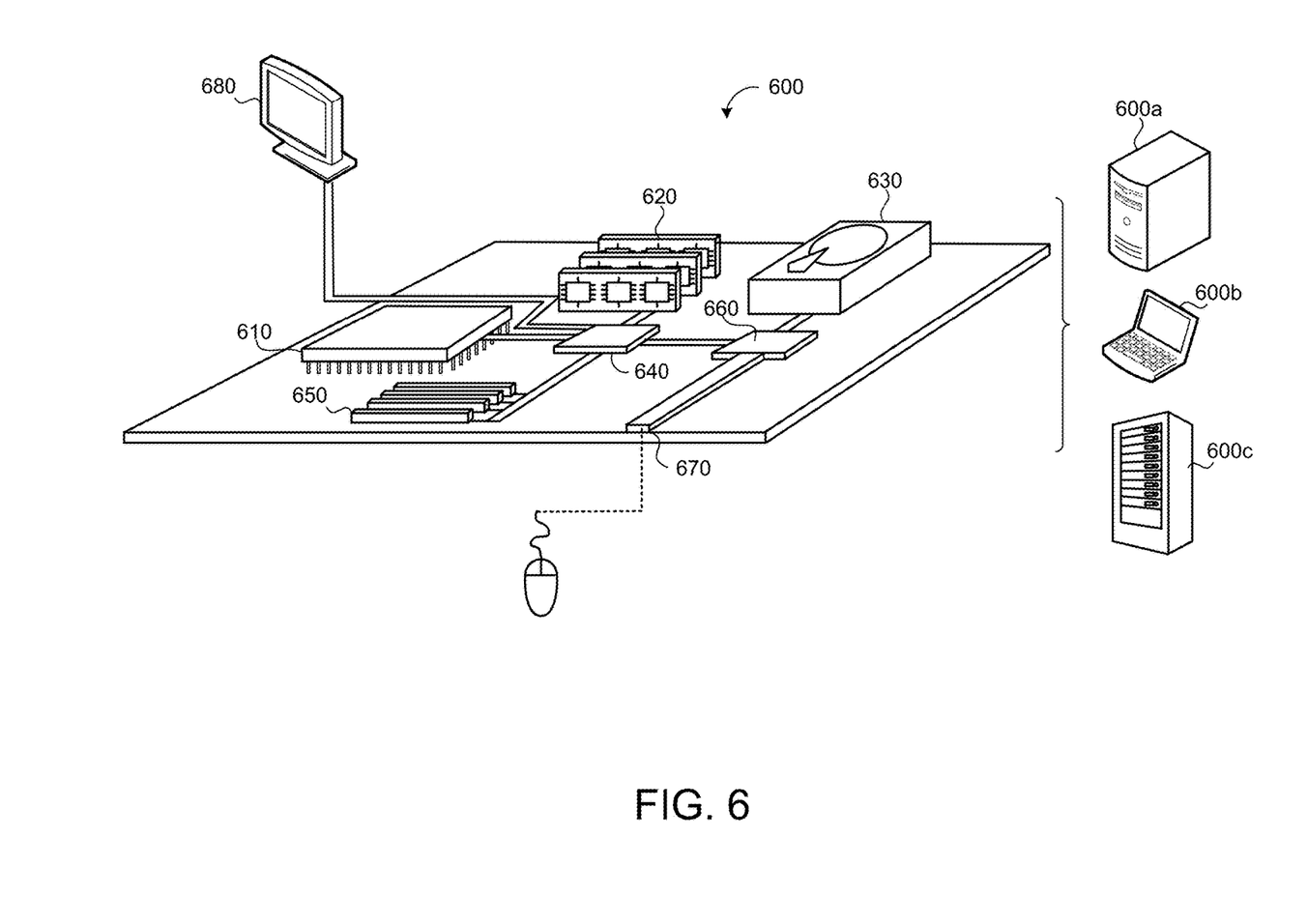
FIG. 6 is a schematic view of an example computing device.

FIG. 6 is schematic view of an example computing device 600 (e.g., data processing hardware) that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to low speed bus 670 and storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 (e.g. memory hardware) is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 930, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and low-speed expansion port 670. The low-speed expansion port 670, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

An example of connected-mode mobility control on a computing device 600 (e.g., data processing hardware) implemented on a user device 200 is shown below. The example includes 16 steps and may be described with reference to FIGS. 1-6.

1. Mobile device is RRC Connected on a first network.
2. First network (per normal network behavior) has configured the mobile device with measurement triggers for normal intra-network handover. These measurement triggers cause measurement reports to be sent to the base station in the first network.
3. A mobility manager application running on the operating system configures the mobile device with additional measurement triggers. These measurement triggers cause measurement reports to be sent to the mobility manager application. A first measurement trigger is a proximity trigger: a target network has been detected nearby (entering) or is no longer nearby (leaving). The proximity trigger is configured for a band (range of channels), for example the US CBRS band (3.55 GHz-3.7 GHz).
4. The modem detects proximity and sends a proximity indication to the mobility manager. The proximity indication provides the EARFCN of the detected target network.
5. The mobility manager responds by provisioning additional measurement triggers on at least the target EARFCN:
    A second measurement trigger is a switch-request trigger: target network quality exceeds first network quality by more than N dB, where N is a number such as 5 dB.
    A third measurement trigger is an early-warning trigger: target network quality exceeds first network quality by more than N-M dB, where M is a number such as 3 dB.
    The early warning trigger is configured to fire before the switch-request trigger, which gives the mobility manager time to perform additional steps.
6. The proximity trigger continues to operate. If it detects the "leaving proximity" condition, a trigger is sent to the connection manager which deactivates the second and third measurement triggers described above.
7. The modem determines a power-efficient way to check the conditions of all of the measurement configurations (from the first network and from the mobility manager application). If the quantity of measurements exceeds the intrinsic capabilities of the modem, the modem may prioritize some over others, for example it may preferentially service the measurement triggers associated with the first network.
8. If the early-warning trigger is activated, the modem sends a measurement report to the mobility manager. The report contains the signal quality of the detected base station in the target network, as well as the Physical Cell Id, CSG Id, and PLMN of that cell. These are standard LTE quantities defined in 3GPP TS 36.331.
9. The mobility manager receives the early-warning trigger and sends a reportCGI measurement configuration to the modem, to request the modem to read more information about the target base station, including its unique ID, the ECGI.
10. The modem carries out the reportCGI operation and provides the resulting information to the mobility manager.

11. The mobility manager looks up the ECGI in an internal table, provisioned for example via the network, to determine the Cell Individual Offset relevant to the target base station. The mobility manager reconfigures the measurement triggers on the modem to take into account the Cell Individual Offset, if it is different than the one already configured for that PCI.

12. The mobility manager queries the network or uses an internal table to determine the suitability of the target cell for handover. Suitability may include an assessment of the load of the target cell, the load on the backhaul of the target cell, or the features of the target cell such as the ability to support voice calls. The assessment of the target cell may require a query to a network server. To minimize queries, it is advantageous to learn the status of nearby cells as part of the query. The network server can automatically provide the status of cells that in the neighborhood of the target cell.

13. The modem determines that the switch-request trigger conditions have been met, and sends a corresponding measurement report to the mobility manager.

14. The mobility manager makes a switching determination. The determination may be based on:

The measurement results in the switch-request report

The suitability of the target cell for handover (using aforementioned criterion such as cell load, backhaul load, or ability to support voice calls)

Cell access control, e.g., whether the mobile device is authorized to use the target cell.

Authorization can be on a per-operator basis, e.g., if the mobile device is a MNO X device, the authorization determines whether the target cell is part of the MNO X's partnership network.

Authorization can be on a per-user basis, e.g., the owner of the mobile device has a business relationship with the owner of the target cell.

Active vs. Idle status of modem on the first network.

Information about the context of the mobile device, including position, movement (e.g., from accelerometers), signal strength from other radios such as WiFi radios, currently active applications.

The output of a trained machine-learning algorithm that takes the above information as input, where the training is provided in part by the history of this and other mobile devices.

15. The mobility manager instructs the modem to perform the network switch.

16. After the switch (successful or not) the modem sends the mobility manager a switch report, which includes:

The elements enumerated in TS 36.331v12 section 5.3.5.6, and further detailed in the RLF-Report-r9 message, including: (i) EPLMN list, (ii) RSRP and RSRQ of the last serving cell, (iii) RSRP and RSRQ of and neighboring cells, including UTRA and GERAN neighbors, (iv) the target cell identity, (v) the last serving cell identity, (vi) indication of success vs. failure, (vii) failure cause (e.g., authentication failure, connection establishment failure), (viii) time elapsed between receipt of mobility command and success/failure declaration.

In the event of failure, ConnEstFailReport-r11.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
   receiving, at data processing hardware of a user device, one or more data packets from an external network when the user device connects to a first network, the user device configured for dual connectivity with the first network and a second network;
   transmitting a measurement configuration from the data processing hardware to a modem of the user device;
   receiving, at the data processing hardware, a measurement report from the modem, the measurement report based on the transmitted measurement configuration;
   determining, by the data processing hardware, whether the received measurement report indicates a quality of the second network that exceeds a quality of the first network by a quality threshold; and
   when the quality of the second network exceeds the quality of the first network by the quality threshold, transmitting a network change command from the data processing hardware to the modem, the network change command causing the modem to perform a network switch to connect the user device to the second network.

2. The method of claim 1, wherein the first network comprises one of a macro-cell network or a neutral host network and the second network comprises the other one of the macro-cell network or the neutral host network.

3. The method of claim 2, wherein:
   the macro-cell network comprises a first long-term evolution radio access network supporting radio communication with the external network via one or more macro-cell evolved nodes; and the neutral host network comprises a second long-term evolution radio access network supporting radio communication with the external network via one or more neutral host evolved nodes.

4. The method of claim 2, wherein the macro-cell network is deployed by a mobile network operator and the neutral host network is deployed by an entity separate from the mobile network operator.

5. The method of claim 4, wherein the neutral host network supports multiple carriers from several different mobile network operators.

6. The method of claim 1, wherein the measurement configuration contains one or more measurement triggers that cause the modem to transmit the measurement report to the data processing hardware.

7. The method of claim 6, wherein at least one of the measurement triggers comprises a switch-request trigger that is satisfied when the quality of the second network exceeds the quality of the first network by the quality threshold.

8. The method of claim 7, wherein receiving the measurement report from the modem comprises receiving a switch-request report from the modem when the switch-request trigger is satisfied.

9. The method of claim 1, wherein transmitting the network change command from the data processing hardware to the modem is further based on at least one of cell load on the second network, backhaul load on the second network, or an ability for the second network to support voice calls.

10. The method of claim 1, wherein transmitting the network change command from the data processing hardware to the modem is further based on at least one of a geographic position of the user device, movement by the user device, signal strength from other radios, or currently active software applications executing on the data processing hardware.

11. The method of claim 1, further comprising receiving, at the data processing hardware, a switching report message from the modem, the switching report message indicating whether or not the network switch was a success or a failure.

12. A system configured for wireless communication, the system comprising:
- a first network in communication with an external network;
- a second network in communication with the external network; and
- a user device configured for dual connectivity to the first network and the second network, the user device communicating with the external network when connected to the first network or the second network, the user device comprising data processing hardware and memory hardware in communication with the data processing hardware, the memory hardware storing instructions that when executed on the data processing hardware cause the data processing hardware to perform operations comprising:
  - receiving one or more data packets from the external network when the user device connects to the first network;
  - transmitting a measurement configuration to a modem of the user device;
  - receiving a measurement report from the modem, the measurement report based on the transmitted measurement configuration;
  - determining whether the received measurement report indicates a quality of the second network that exceeds a quality of the first network by a quality threshold; and
  - when the quality of the second network exceeds the quality of the first network by the quality threshold, transmitting a network change command to the modem, the network change command causing the modem to perform a network switch to connect the user device to the second network.

13. The system of claim 12, wherein the first network comprises one of a macro-cell network or a neutral host network and the second network comprises the other one of the macro-cell network or the neutral host network.

14. The system of claim 13, wherein:
the macro-cell network comprises a first long-term evolution radio access network supporting radio communication with the external network via one or more macro-cell evolved nodes; and
the neutral host network comprises a second long-term evolution radio access network supporting radio communication with the external network via one or more neutral host evolved nodes.

15. The system of claim 13, wherein the macro-cell network is deployed by a mobile network operator and the neutral host network is deployed by an entity separate from the mobile network operator.

16. The system of claim 15, wherein the neutral host network supports multiple carriers from several different mobile network operators.

17. The system of claim 12, wherein the measurement configuration contains one or more measurement triggers that cause the modem to transmit the measurement report to the data processing hardware.

18. The system of claim 17, wherein at least one of the measurement triggers comprises a switch-request trigger that is satisfied when the quality of the second network exceeds the quality of the first network by the quality threshold.

19. The system of claim 18, wherein receiving the measurement report from the modem comprises receiving a switch-request report from the modem when the switch-request trigger is satisfied.

20. The system of claim 12, wherein transmitting the network change command from the data processing hardware to the modem is further based on at least one of cell load on the second network, backhaul load on the second network, or an ability for the second network to support voice calls.

21. The system of claim 12, wherein transmitting the network change command from the data processing hardware to the modem is further based on at least one of a geographic position of the user device, movement by the user device, signal strength from other radios, or currently active software applications executing on the data processing hardware.

22. The system of claim 12, wherein the operations further comprise receiving a switching report message from the modem, the switching report message indicating whether or not the network switch was a success or a failure.

* * * * *